(12) United States Patent
Criscione (10) Patent No.: US 6,310,466 B1
(45) Date of Patent: Oct. 30, 2001

(54) SYNCHRONOUS CMOS RECTIFYING CIRCUIT FOR STEP-UP DEVICES

(75) Inventor: Marcello Criscione, Ragusa (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/610,300

(22) Filed: Jul. 5, 2000

(30) Foreign Application Priority Data

Jul. 5, 1999 (EP) .................................................. 99830432

(51) Int. Cl.[7] .......................................................... G05F 1/10
(52) U.S. Cl. ............................................................. 323/222
(58) Field of Search .................................... 323/222, 224, 323/223, 266

(56) References Cited

U.S. PATENT DOCUMENTS

| 4,433,253 | * | 2/1984 | Zapisek | 327/536 |
| 5,751,139 | | 5/1998 | Jordan et al. | 323/222 |
| 5,929,615 | * | 7/1999 | D'Angelo et al. | 323/224 |
| 5,994,882 | * | 11/1999 | Ma | 323/222 |
| 6,091,232 | * | 7/2000 | Criscione et al. | 323/222 |

FOREIGN PATENT DOCUMENTS 0 933 865 A1   12/1997  (EP) .

OTHER PUBLICATIONS

"1–Cell to 2–Cell, Low–Noise, High–Efficiency, Step–Up DC–DC Converter" in Maxim Integrated Products Brochure, Jul. 1998, pp. 1–12.

* cited by examiner

Primary Examiner—Adolf Deneke Berhane
(74) Attorney, Agent, or Firm—Theodore E. Galanthay; Robert Iannucci; Seed IP Law Group, PLLC (57) ABSTRACT

Presented is a DC/DC converting circuit adapted to convert a DC input voltage to a DC output voltage. The converting circuit uses, as its synchronous rectifier member, a PMOS bipolar power transistor of the PMOS type, and allows it to be turned on by a control logic circuit capable of quickly sensing automatically the difference in electric potential between a conduction terminal and the body terminal of the transistor.

14 Claims, 12 Drawing Sheets

SYNCHRONOUS CMOS RECTIFYING CIRCUIT FOR STEP-UP DEVICES

TECHNICAL FIELD

This invention relates to a synchronous CMOS rectifying circuit for step-up devices and to a method of carrying out a DC/DC conversion by means of the rectifying circuit.

More particularly, the invention deals with a family of high-efficiency synchronous circuits for switching control that can be operated in the step-up mode even at very low (around 0.8 V) supply voltages and very small idle currents.

BACKGROUND OF THE INVENTION

Considerable research work is being conducted in the field of synchronous rectifying circuits, specifically for step-up devices, which can be operated at very low (e.g., 0.8 V) supply voltages and very small idle currents.

The demand for rectifiers with such features comes especially from those applications where battery-powered apparatuses, such as pagers, cellular phones, portable computers, and more generally long-range portable apparatuses, require that the conversion of a battery voltage to a stabilized voltage of a higher value be carried out in a most efficient manner.

A general trend in the design of such rectifiers provides for the use of active switch elements having very low internal resistance and a high switching rate, and the use, as active elements, of field-effect transistors or bipolar transistors in place of the loop-back diodes employed in the past. The class of converters thus produced are known as synchronous rectifying converters, also on account of a control logic being provided therein which is effective to perfectly synchronize the opening and closing of the switch elements and prevent simultaneous activation (cross-conduction) from occurring, as this would result in large power dissipation or unacceptably poor performance.

A synchronous rectifying circuit ideally should be capable of operating with very low supply voltages and of minimizing cross-conduction losses as the switch elements are turned on simultaneously.

Additional features expected of such an ideal rectifier include the following: it should produce full disconnection of the output load from the electrical source in a shut-down situation and with an output voltage Vout=0; it should dampen out the oscillation that appears as the inductor is fully discharged due to the presence of parasitic capacitances in the switch elements (damped ringing); it should enhance the converting efficiency of the circuit; and it should automatically clamp the internal supply voltage of the circuit to the highest available potential (self-bootstrapping).

Figure 1:
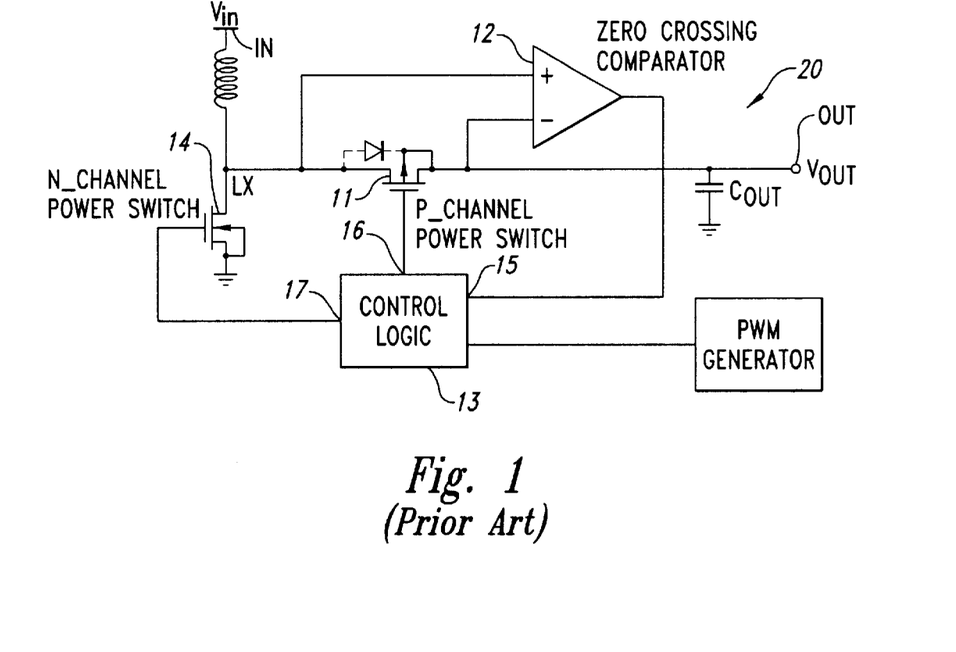
FIG. 1 is a schematic diagram of a DC/DC converter circuit in a step-up configuration, according to the prior art.

Shown by way of example in FIG. 1 is a schematic diagram of a prior art synchronous rectifying circuit 20 as applied to a step-up topology. The circuit has an input terminal IN which is supplied a voltage Vin, and has an output terminal OUT which is connected to an electric load. The circuit 20 uses a P-channel Power-MOS 11 for a switch element. A control logic 13 controls the sequencing and times the actuations of a switch 14 and the switch 11 through respective outputs 17 and 16. By using an active device for the switch element 11, a smaller voltage drop can be obtained in transferring power to the load.

A sensing element 18 adapted to sense the current being transferred to the load is provided for a compare block 12, which is arranged to control the transfer of power and send a suitable signal to the control logic 13 through an input 15.

The signal from the compare block 12 effectively prevents the Power-MOS 11 from also transferring power from the load to the input IN, thus reversing the current direction and defeating all attempts at improved efficiency.

The determination to use a P-channel Power-MOS for a switch element is justified by the low internal resistance of Power-MOSs and the ability to use a voltage-oriented rather than current-oriented drive. Unfortunately, the presence of the Power-PMOS body connection introduces, as shown in FIG. 1, a large-size diode across the input and output terminals of the circuit 20. At start-up, when the output voltage is still close to zero, this large diode allows an inrush of current whose maximum value can be far above the peak value during steady-state operation and which can detrimental effects on the passive components (e.g., inductor 18), unless the latter are provided oversize to accommodate this initial transient phase.

An attempt to depress the maximum value of the inrush current by the use of a limiting resistor admittedly would safeguard the components, but also result in unacceptably large power losses.

Lastly, the presence of the parasitic diode makes adjusting the output voltage to values below Vin–$V_{BE}$ (step-down configuration) impracticable.

Figure 2:
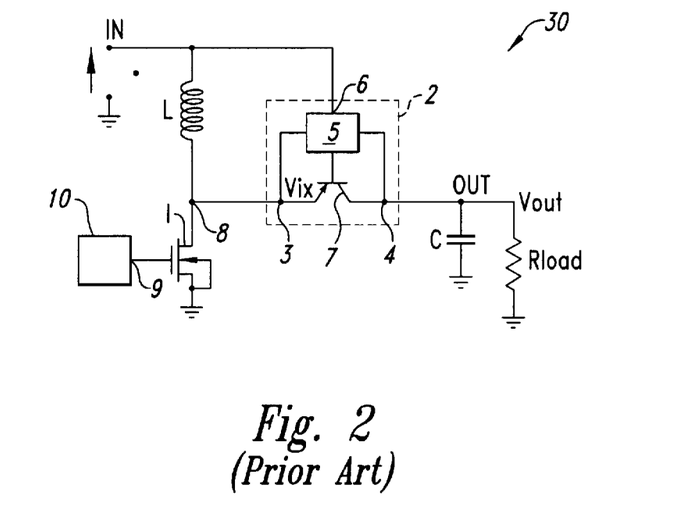
FIG. 2 is a schematic diagram of a bipolar technology, synchronous rectifying circuit intended for a step-up type of converter, according to the prior art.

Another approach to providing a highly efficient synchronous rectifier is shown in FIG. 2 and described in European Patent Application No. 97830740.3 by this Applicant, and herein specifically incorporated by reference in toto.

Shown in that Figure is a synchronous rectifier 30 which includes a bipolar transistor 7 as a switch element. A rectifier block 2 includes a control logic 5 which is connected to all the terminals 3, 4 of the transistor 7 and receives the supply voltage Vin on an input 6.

A second switch element 1 is provided which is formed with MOS technology and incorporates a control logic 10.

While in many ways advantageous, this solution is inadequate to remove all the ringing and minimize the losses from cross-conduction.

Figure 3:
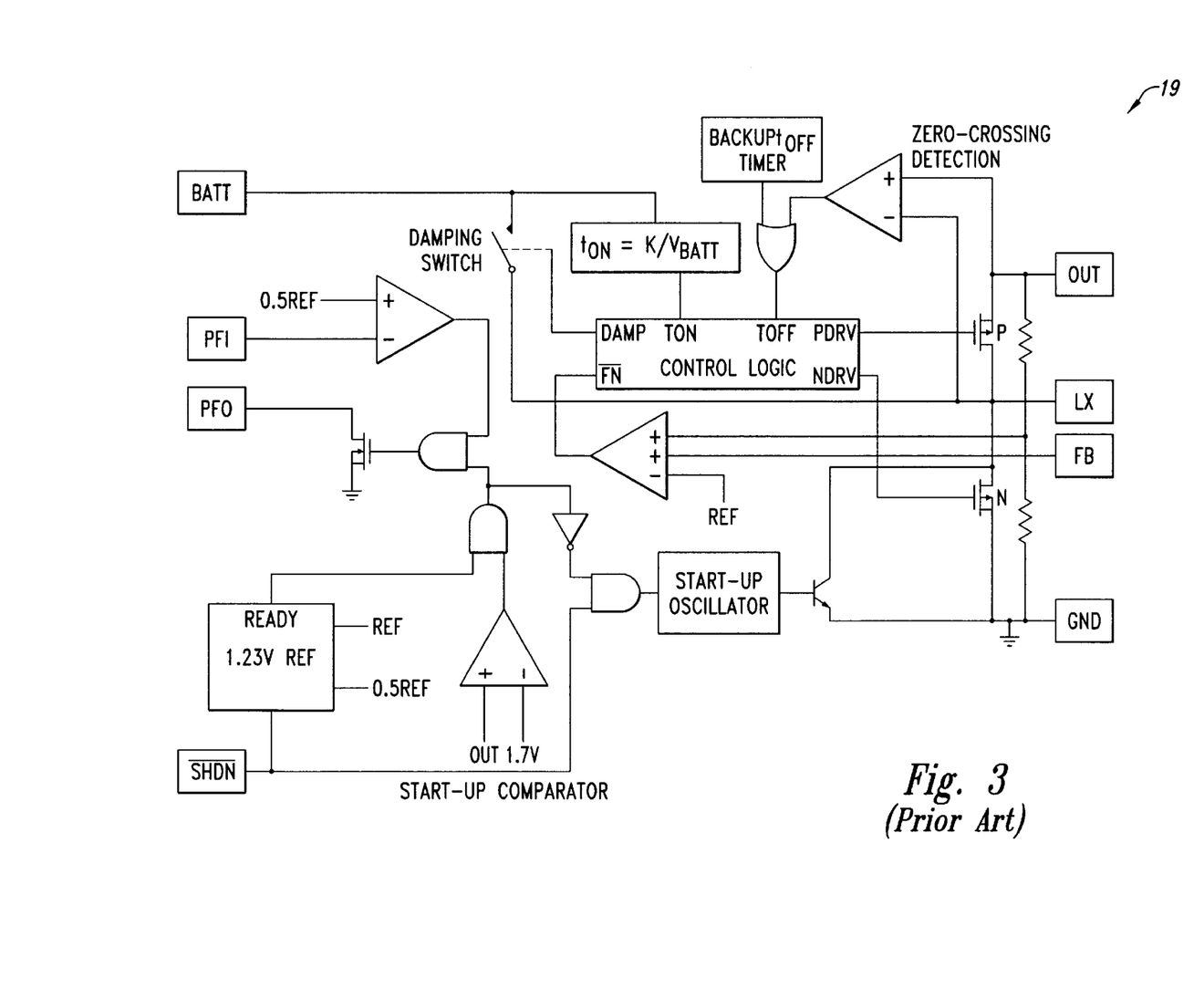
FIG. 3 is a schematic diagram of yet another prior rectifying circuit.

A further prior approach is shown schematically in FIG. 3. This is a synchronous rectifying circuit 19 manufactured by Maxim Semiconductors. This circuit cannot be operated at lower voltages than 1.7 V.

To summarize, all of the prior art solutions, although providing highly efficient step-up converters, still have limitations and deficiencies, including complex control logic circuitry, inability to operate with low supply voltages, possible cross-conduction side effects, and inability to operate in a step-up/step-down combined mode.

Until now, no high-efficiency rectifying circuit, particularly intended for step-up/step-down applications, was available that provided a uniquely simple construction combined with outstanding performance in terms of ringing suppression and full disconnection of the load in the shut-down mode.

SUMMARY OF THE INVENTION

Embodiments of the invention use, as the gist of the synchronous rectifier, a MOS type of power transistor which can suppress the ringing effect and ensure full shutting down of the load.

Presented, therefore is a synchronous CMOS rectifying circuit that has an input terminal and an output terminal for converting a DC input voltage into a DC output voltage. The rectifying circuit includes an inductor selectively coupled to the input terminal, and a first electronic switch to selectively control the coupling of the inductor. The rectifying circuit also includes a MOS power transistor for coupling the inductor to the output terminal, and a biasing circuit for biasing a body terminal of the MOS power transistor with one of the voltages that it receives at a first bias input or a second bias input. In one embodiment the first bias input is coupled to the input terminal and the second bias input is coupled to the output terminal. The MOS power transistor has a first conduction terminal connected to a terminal of the inductor, a second conduction terminal coupled to the output terminal of the rectifier, and is driven at a control terminal by a control logic circuit effective to sense a difference in electric potential between at least one conduction terminal of the MOS power transistor and the body terminal of the MOS power transistor.

Also presented is a method of converting a DC input signal presented on an input terminal into a DC output signal presented on an output terminal of a converting/rectifying circuit. The method uses a first electronic switch to selectively couple the inductor to the input terminal for transferring energy from the input terminal to the output terminal, and includes a MOS power transistor. The MOS power transistor, that is coupled between the input and the output terminals, is driven by a driving circuit according to a difference in electric potential between at least one conduction terminal and a body terminal of the MOS power transistor, while the body terminal is driven with a voltage that always keeps parasitic diodes within the MOS transistor reverse biased.

The features and advantages of the circuits and methods embodying this invention will become apparent from the following detailed description of an embodiment thereof, given by way of example and not of limitation with reference to the accompanying drawings.

DETAILED DESCRIPTION OF THE INVENTION

Figure 4:
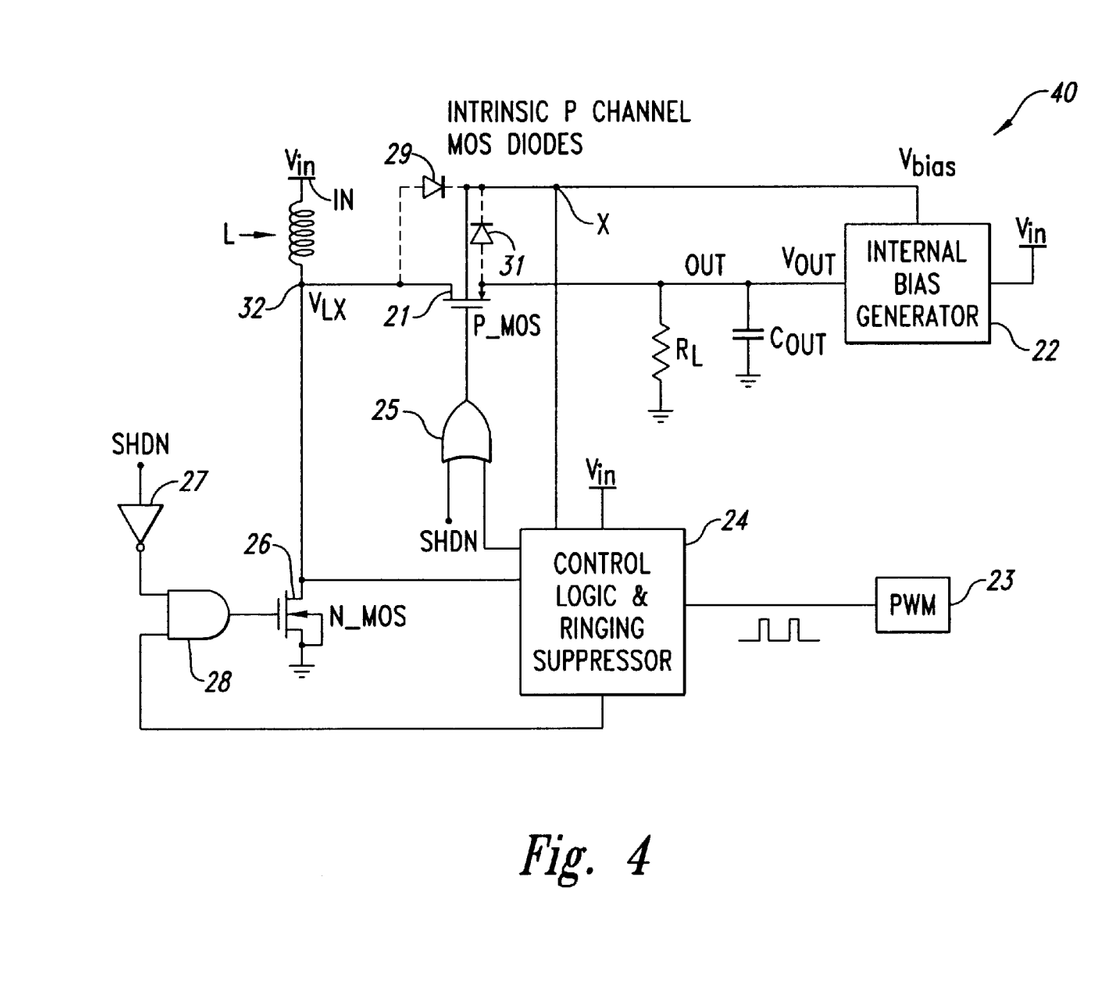
FIG. 4 is a schematic diagram of a CMOS rectifying circuit according to an embodiment of the invention.

Referring to the drawing views, specifically to the example shown in FIG. 4, a circuit diagram of a synchronous CMOS rectifier according to an embodiment of this invention is shown generally at 40 in schematic form.

The rectifying circuit 40 has an input terminal IN which is applied an input voltage Vin, and has an output terminal OUT where a rectified and stabilized DC output voltage Vout is made available.

The circuit 40 includes an inductor L adapted to transfer power from the input terminal IN to the output terminal OUT. A capacitor Cout is provided that is connected between the output terminal OUT and a ground reference GND to store energy as transferred from the inductor L. A first electronic switch 26 is coupled between the inductor L and the ground reference GND, and is adapted for coupling the inductor to the DC input voltage Vin. The circuit 40 also includes a second electronic switch 21 adapted for coupling the inductor L to the output terminal OUT.

The first electronic switch 26 is an N-channel MOS power transistor, and is controlled by a control circuit 24 that handles its timing through a logic gate 28 receiving a signal SHDN on one input via an inverter 27.

The second electronic switch 21 has a first conduction terminal coupled to the inductor L at a node 32, and has a second terminal coupled to the output terminal OUT of the converter 40. Advantageously, the second switch 21 is a power transistor, preferably of the PMOS type, which has a main conduction path linking the inductor L to the output terminal OUT. The PMOS switch 21 includes parasitic diodes 29, 31.

The control circuit 24 also drives the transistor 21 and senses the difference in electric potential between at least one of its conduction terminals, represented by the node 32, and its body terminal, represented by a bias node X. The control circuit 24 causes the power transistor 21 to conduct by activating a control terminal through a logic gate 25, which also receives the signal SHDN, when the electric potential Vlx at the node 32 is lower than the potential Vx at the body terminal X.

The control circuit 24 has an additional input terminal coupled to the input terminal IN of the converter to sense the electric potential of the input voltage Vin. This additional input terminal allows the control circuit 24 to compare the input voltage Vin with the output voltage Vout and, accordingly, operate correctly in either the step-up or the step-down mode.

The circuit 40 can control a synchronous CMOS rectifier architecture, starting from a supply voltage which may be as low as 0.8 V, and thus effect a highly efficient step-up conversion, suppress high-frequency ringing at the inductor, and ensure EMI noise reduction and power off.

The circuit 40 only employs N-channel and P-channel CMOS devices of the enhancement type using CMOS/BiCMOS technology. This circuit is specially suitable for incorporation to a step-up DC-to-DC converter.

The control circuit 24 functions to synchronize the turning on/off of the power switches 26, 21 and to provide a shutdown condition for the circuit 40 with full disconnection of the output load.

Further provided within the logic circuit 24 is a ringing suppression circuit portion. In addition, the biasing circuit 22 functions to clamp the internal supply voltage of the whole circuit to the highest electric potential available.

Specifically, the circuit 22 receives the input voltage Vin and the output voltage Vout, and is operative to clamp, at the node X and with minimal resistance, the internal voltage Vbias to the highest voltage available in the circuit 40. This arrangement allows the parasitic body-drain 29 and body-source 31 diodes of the P-channel transistor 21 to be reverse biased at all times, i.e., under any conditions of operation, thereby removing the limitation that all prior synchronous CMOS architectures imposed typically on a minimum Vout.

In the instance of a step-up topology with full disconnection of the load in the shut-down condition, upon startup of the circuit 40, the highest voltage (Vmax) available in the circuit will be:

$$Vmax = Vin;$$

but, since Vout=0 at steady state, it is:

$$Vmax=Vout<Vin.$$

Figure 5:
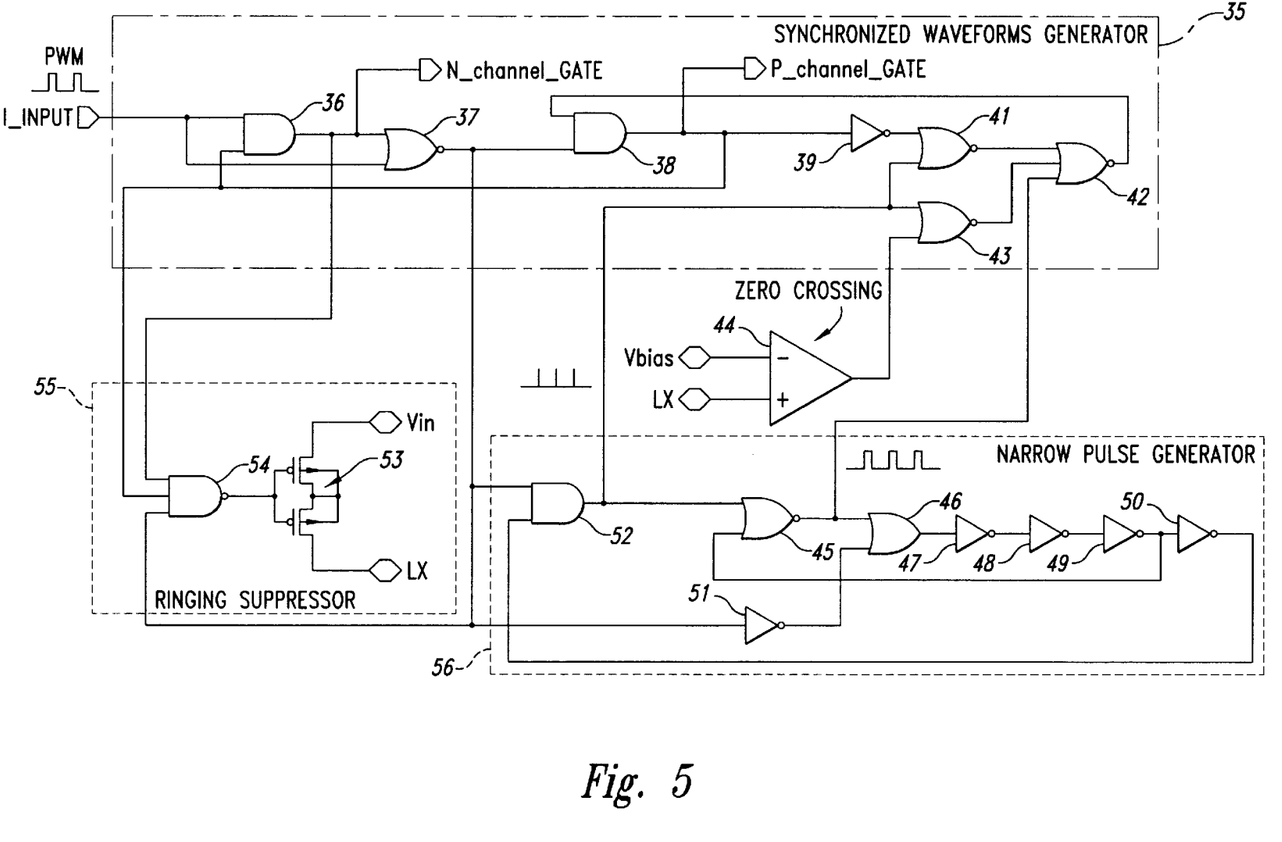
FIG. 5 is a circuit diagram of one embodiment of a portion of the rectifying circuit in FIG. 4.

A possible example of how the logic circuit 24 can be implemented is illustrated by the detailed block diagram of FIG. 5.

A zero crossing comparator 44 is connected in the circuit 24 to turn off the P-channel power transistor 21 when, in a discontinual mode of operation, the inductor energy is completely depleted during the switching cycle. In this case, the voltage across the inductor would be 0 V, and the comparison carried out between the node 32 at a voltage Vlx and a voltage Vbias=Vx generated internally by the biasing circuit 22 and appearing at the node X. This voltage Vbias is given as:

$$Vbias=max(Vin,Vout).$$

Figure 6:
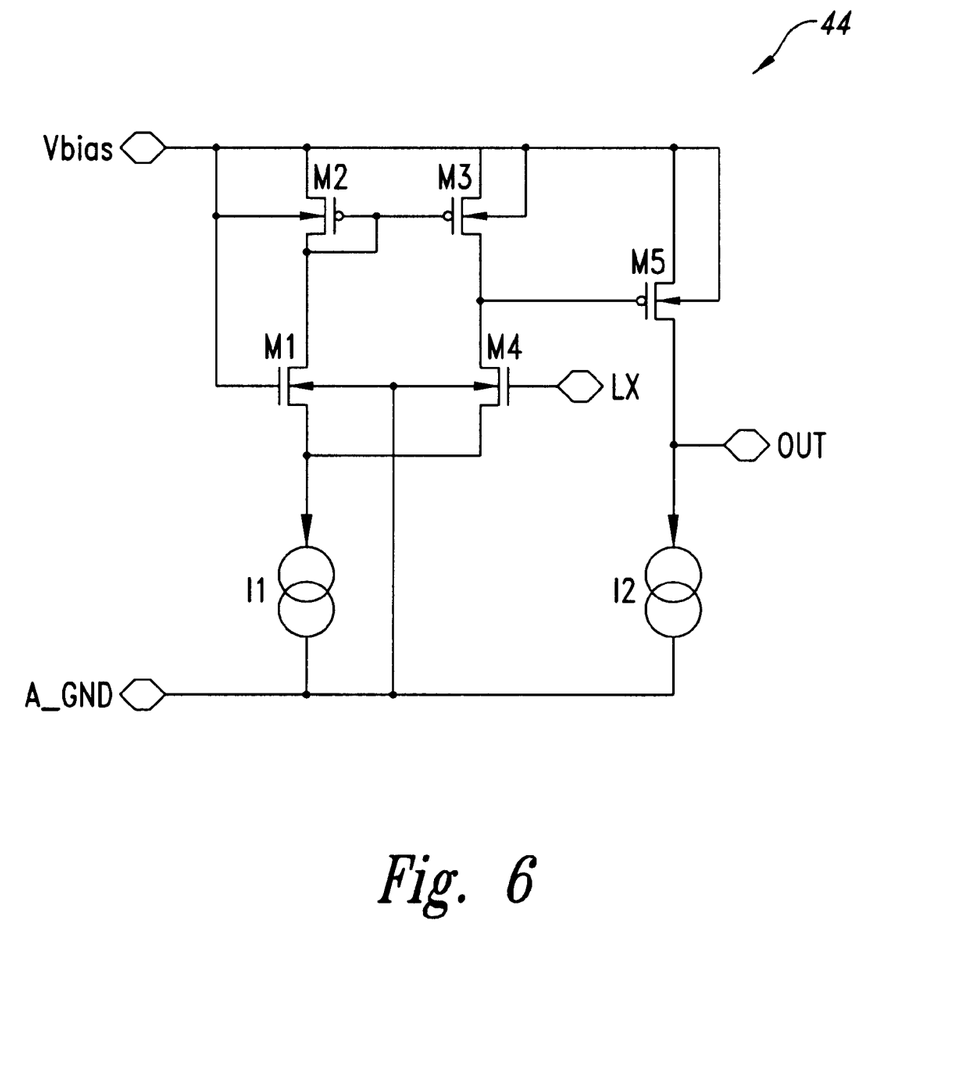
FIG. 6 is a wiring diagram of a detail of the portion shown in FIG. 5.
Figure 7A:
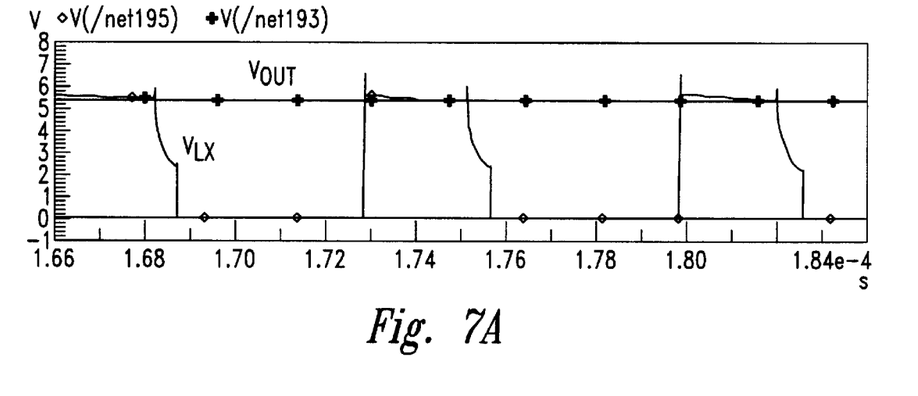
FIGS. 7A to 7D are plots, on the same time base, of waveforms of voltage signals which appear in the rectifying circuit of a tested embodiment of this invention in the step-up mode of operation.
Figure 7B:
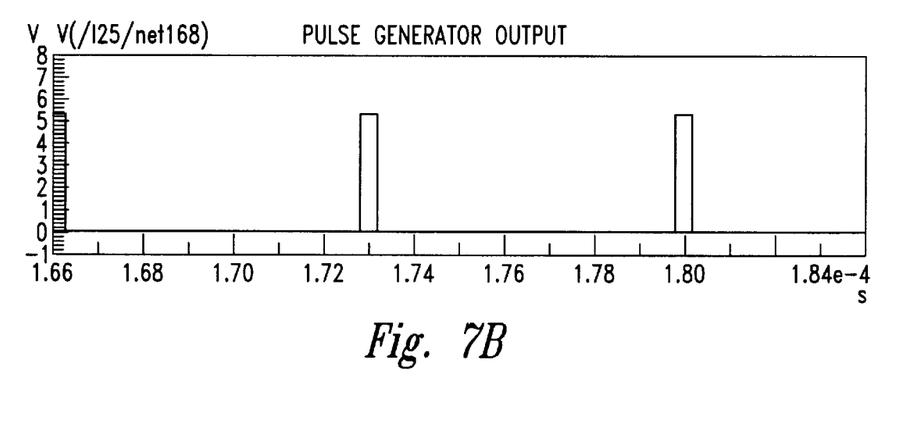
Figure 7C:
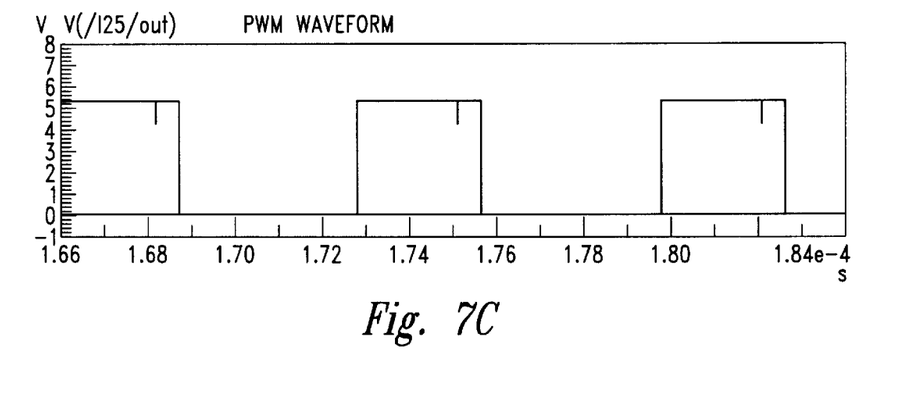
Figure 7D:
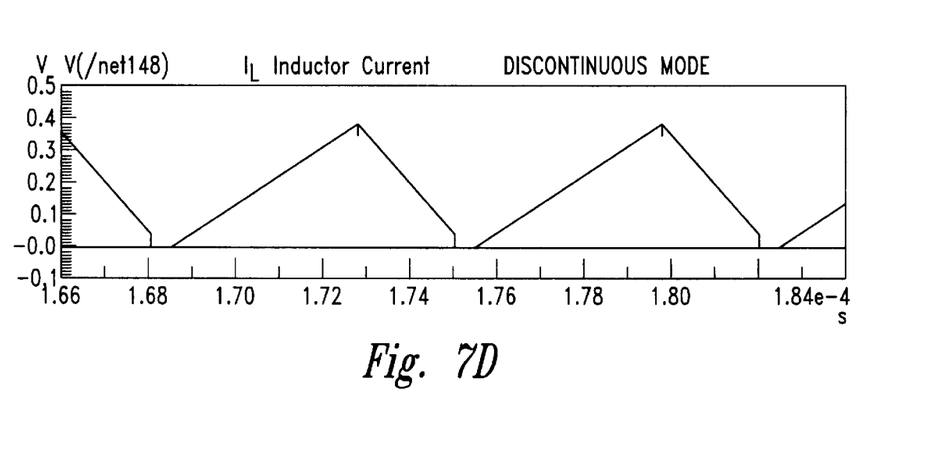
Figure 8A:
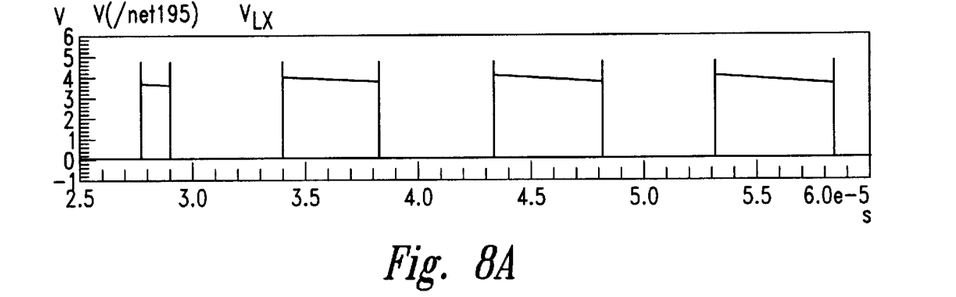
FIGS. 8A to 8E are plots, on the same time base, of waveforms of voltage signals which appear in the rectifying circuit of a tested embodiment of this invention in a continual mode of operation.
Figure 8B:
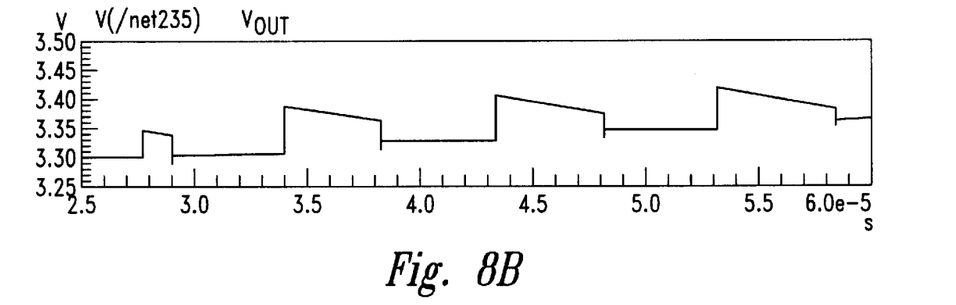
Figure 8C:
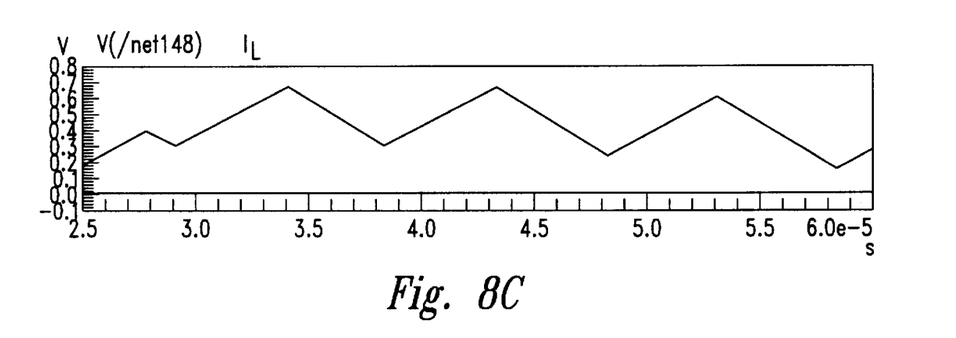
Figure 8D:
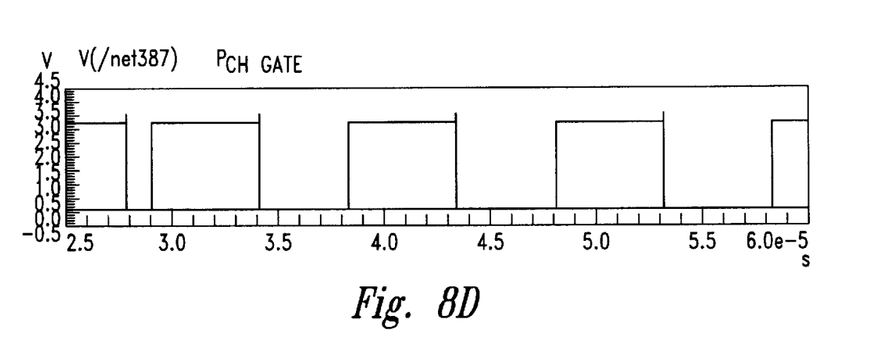
Figure 8E:
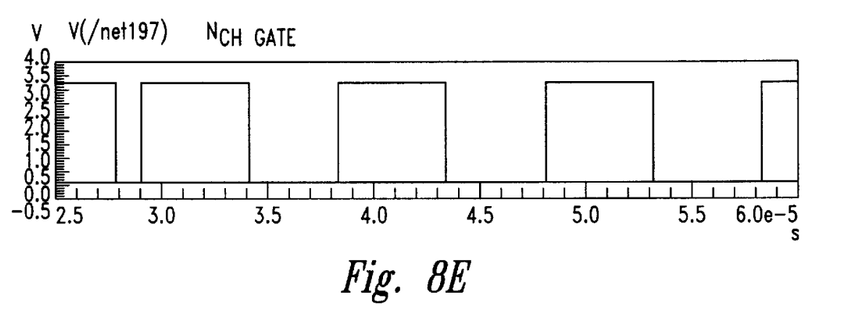
Figure 9A:
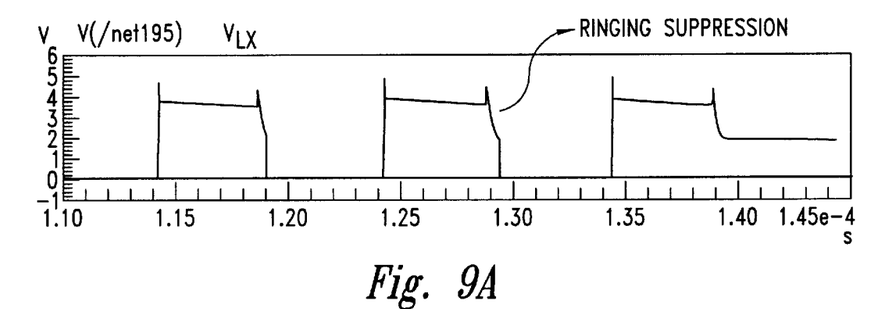
FIGS. 9A to 9E are plots, on the same time base, of waveforms of voltage signals which appear in the rectifying circuit of a tested embodiment of this invention in a discontinual mode of operation.
Figure 9B:
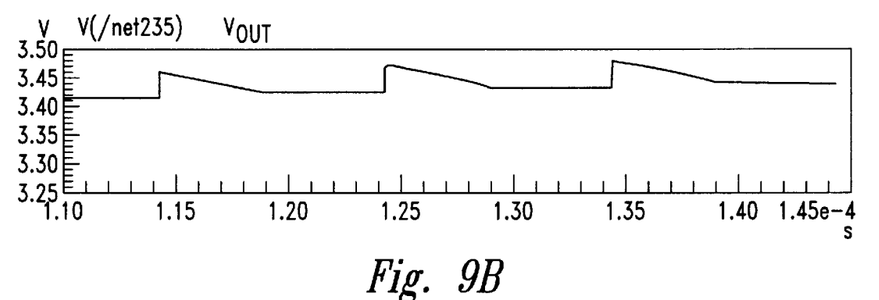
Figure 9C:
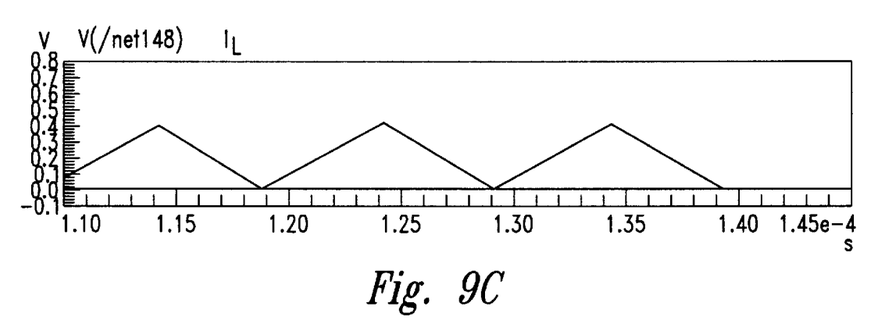
Figure 9D:
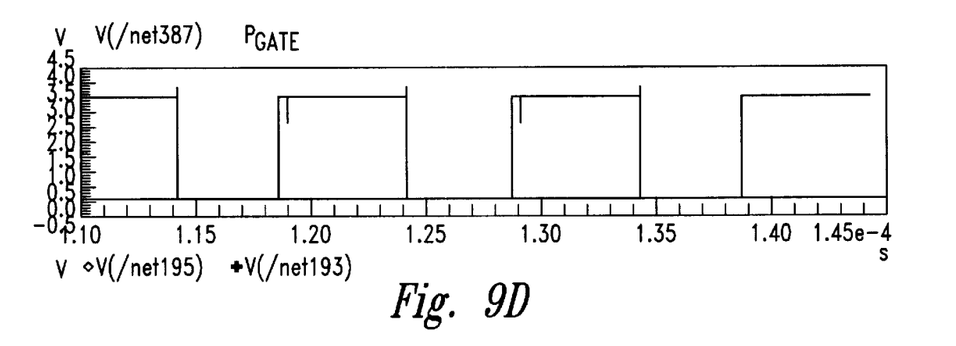
Figure 9E:
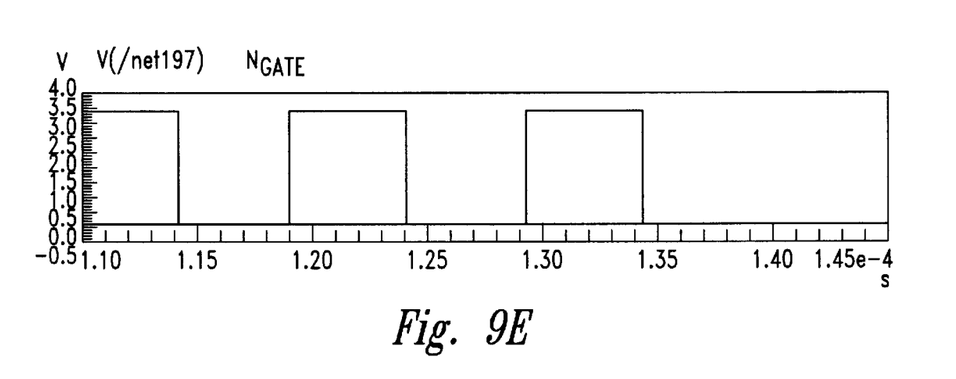

A wiring diagram of a possible implementation of the zero crossing comparator 44, having compatible inputs with Vbias, is shown in FIG. 6.

The P-channel transistor 21 is always turned off when the inductor current is zero (e.g., in step-up mode).

The circuit 24 also includes a digital circuit portion 56 adapted to generate short pulses on the trailing edge of the gate voltage of the N-channel MOS power switch transistor 26. This portion 56 comprises a series of two-input logic gates 52, 45, 46 and a series of inverters 47, 48, 49, 50 for feeding the output signal from the last logic gate in the series back to one of the other logic gate inputs.

The short pulses generated by the circuit portion 56 are used for turning on, in a synchronous manner and with minimized cross conduction, the P-channel power transistor 21, regardless of the value attained by the output of the zero crossing comparator 44 described previously. During the power-off transient of the N-channel transistor 26, the electric potential Vlx at the node 32 is for a short time higher than the output voltage Vout, so that the zero crossing comparator 44 would issue a wrong instruction not to turn on the P-channel transistor 21, thereby causing substantial delay in the turning on of this transistor and penalizing the conversion efficiency of the circuit.

The logic circuit 24 further includes a drive circuit block 35 which includes a latch adapted to generate synchronized waveforms for driving the control (gate) terminals of the MOS transistors 21 and 26.

The latch 35 receives a signal PWM from an external generator 23 and processes this signal through a series of logic gates. The control signal for the transistor 26 is picked up downstream of a first logic gate 36. This signal is then transmitted to the other transistor 21 through a pair of logic gates 37 and 38 of the NOR and AND type, respectively. Furthermore, the output signal from the logic gate 38 is applied to an input of the logic gate 36. The construction of the latch 35 is completed by an inverter 39 and a set of NOR logic gates 41, 42 and 43. The output from the gate 38 is applied to an input of the gate 41 via the inverter 3, the gate 42 being input signals issuing from the gate 41, the gate 43 and the logic gate 45 of the pulse generator 56. The gate 43 receives the output from the comparator 44, on one of its inputs, and on the other input, receives a signal issuing from the logic gate 52 of the pulse generator 56 which is also applied to one input of the other NOR gate 41.

The construction of the logic circuit 24 further includes a ringing suppression circuit portion 55 which removes high-frequency oscillations that occur, in the discontinual mode of operation, within the node 32 at the electric potential Vlx in consequence of the power-off transient of the second order circuit formed of the inductor and the parasitic capacitances of the power transistors 26 and 21. The overall effect of the circuit is one of degrading the Q (pole quality factor) of the oscillating circuit, thus heavily damping the free oscillations.

The circuit portion 55 includes a logic gate 54 and an output stage 53 consisting of a pair of P-channel MOS transistors that operate to suppress ringing by short-circuiting the inductor. These transistors are provided in a back-to-back configuration in order to prevent their body-drain junctions from being turned on during the power-on time period (Ton) or the power-off time period (Toff) of the waveform PWM that establishes at the node 32.

Figure 10A:
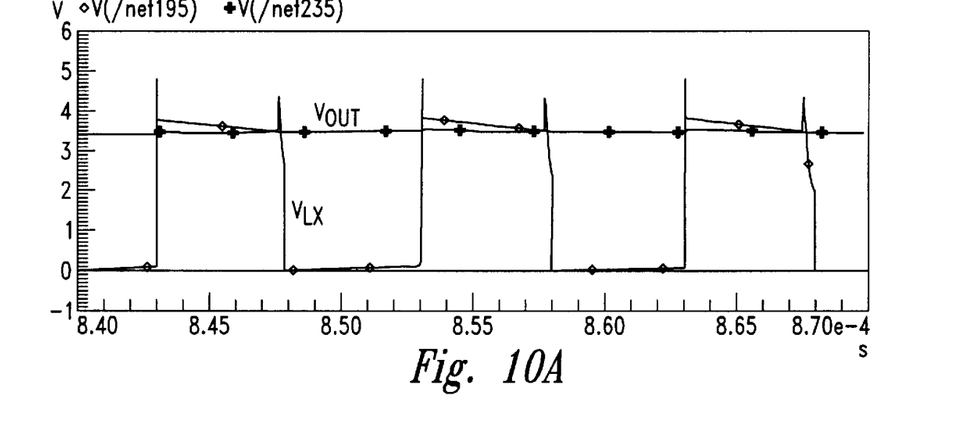
FIGS. 10A to 10C are plots, on the same time base, of waveforms of voltage signals which appear in the rectifying circuit of a tested embodiment of this invention in a continual mode of operation.
Figure 10B:
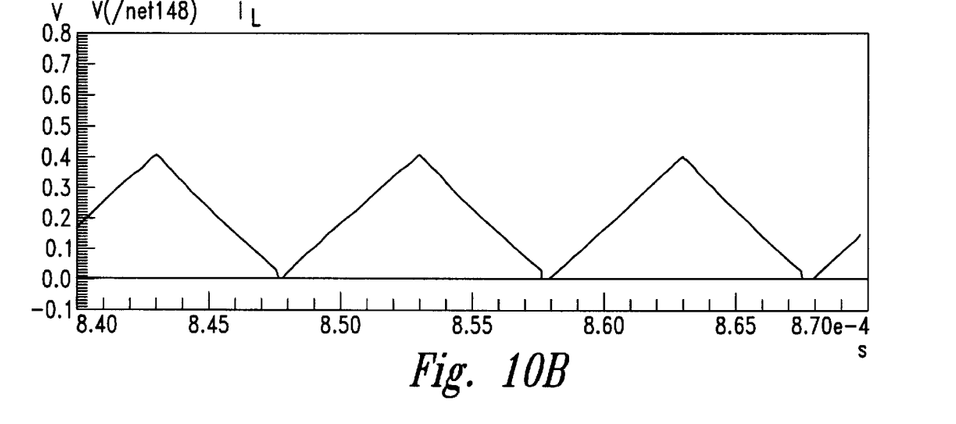
Figure 10C:
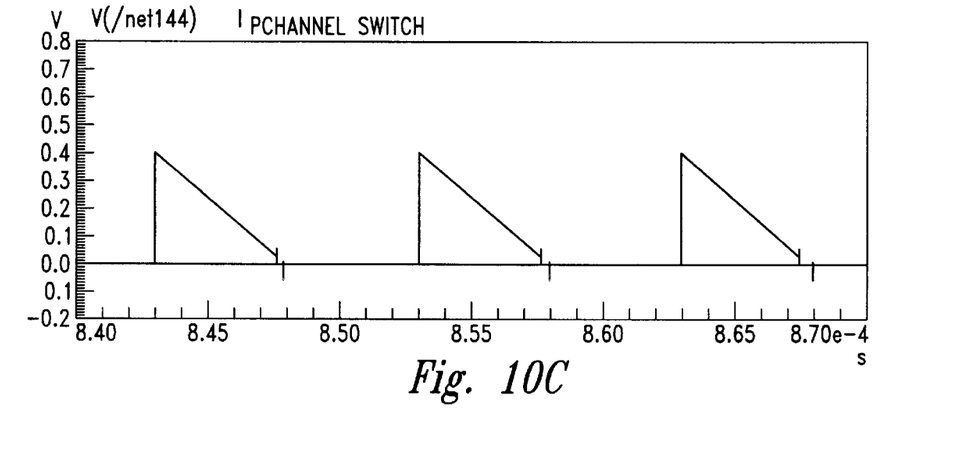

The graphs shown in FIGS. 7A to 7D show waveforms of voltage signals which appear in the rectifying circuit 40 in a step-up mode of operation. The graphs shown in FIGS. 8A to 8D show waveforms of voltage signals which appear in the rectifying circuit 40 in a continual mode of operation. The graphs shown in FIGS. 9A to 9D show waveforms of voltage signals which appear in the rectifying circuit 40 in a discontinual mode of operation. The graphs shown in FIGS. 10A to 10C show waveforms of voltage signals which appear in the rectifying circuit 40 in a continual mode of operation.

Thus, the proposed circuit distinguishes itself from prior synchronous rectifier architectures, overcomes their limitations and affords the following advantages: a step-up DC-to-DC conversion of very high efficiency (typically 90–95%); deactivation of the P-channel 21 parasitic diode; operability starting from very low supply voltages (0.8 V); suppression of the high-frequency ringing that typifies switching regulators in the discontinual mode of operation; and very low standing current consumption (typically 8 $\mu$A).

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A synchronous CMOS rectifying circuit for step-up devices, having an input terminal and an output terminal, and able to convert a DC input voltage to a DC output voltage, the rectifying circuit comprising:

an inductor for transferring energy from the input terminal to the output terminal;

a first electronic switch coupled between the inductor and a reference voltage and having a control terminal;

a MOS power transistor for coupling the inductor to the output terminal, the MOS power transistor having a first conduction terminal connected to a terminal of the inductor, a second conduction terminal coupled to the output terminal of the rectifier, and a control terminal;

a biasing circuit that receives the input voltage at a first bias input and the output voltage at a second bias input and is structured to generate a bias voltage at a body terminal of the MOS power transistor corresponding to the voltage available at either the first or second bias inputs; and a control logic circuit coupled to the control terminal of the MOS power transistor and effective to sense a difference in electric potential between at least one conduction terminal of the MOS power transistor and the body terminal of the MOS power transistor, wherein the control logic circuit comprises:

a drive block for driving the first electronic switch and the MOS power transistor, the drive block having a first output coupled to the control terminal of the first electronic switch, a second output coupled to the control terminal of the MOS power transistor, and an enable input; and a compare block having a first input connected to the at least one conduction terminal, a second input connected to the body terminal, and an output connected to the enable input of the drive block, the compare block being structured to sense a difference in electric potential across the at least one conduction terminal and the body terminal, and to supply an enable signal to the drive block.

2. The circuit according to claim 1 wherein the biasing circuit provides a higher of the first or second bias inputs to the body terminal of the MOS power transistor.

3. The circuit according to claim 1, further comprising a capacitor connected to the output terminal for storing energy being transferred from the inductor.

4. The circuit according to claim 1 wherein the compare block enables the drive block upon the electric potential at the at least one first conduction terminal rising above the electric potential at the body terminal.

5. The circuit according to claim 1 wherein the drive block is a logic gate latch arranged to generate synchronized waveforms.

6. The circuit according to claim 1 wherein the MOS power transistor is a PMOS transistor.

7. A synchronous CMOS rectifying circuit for step-up devices, having an input terminal and an output terminal, and able to convert a DC input voltage to a DC output voltage, the rectifying circuit comprising:

an inductor for transferring energy from the input terminal to the output terminal;

a first electronic switch coupled between the inductor and a reference voltage and having a control terminal;

a MOS power transistor for coupling the inductor to the output terminal, the MOS power transistor having a first conduction terminal connected to a terminal of the inductor, a second conduction terminal coupled to the output terminal of the rectifier, and a control terminal;

a biasing circuit that receives the input voltage at a first bias input and the output voltage at a second bias input and is structured to generate a bias voltage at a body terminal of the MOS power transistor corresponding to the voltage available at either the first or second bias inputs; and a control logic circuit coupled to the control terminal of the MOS power transistor and effective to sense a difference in electric potential between at least one conduction terminal of the MOS power transistor and the body terminal of the MOS power transistor, wherein the control logic circuit further comprises a digital generator having an input coupled to the control terminal of the first electronic switch and an output coupled to the control terminal of the MOS power transistor, the digital generator being structured to generate short pulses for turning on the MOS power transistor synchronously during a power-off transient of the first electronic switch.

8. A synchronous CMOS rectifying circuit for step-up devices, having an input terminal and an output terminal, and able to convert a DC input voltage to a DC output voltage, the rectifying circuit comprising:

an inductor for transferring energy from the input terminal to the output terminal;

a first electronic switch coupled between the inductor and a reference voltage and having a control terminal;

a MOS power transistor for coupling the inductor to the output terminal, the MOS power transistor having a first conduction terminal connected to a terminal of the inductor, a second conduction terminal coupled to the output terminal of the rectifier, and a control terminal;

a biasing circuit that receives the input voltage at a first bias input and the output voltage at a second bias input and is structured to generate a bias voltage at a body terminal of the MOS power transistor corresponding to the voltage available at either the first or second bias inputs; and a control logic circuit coupled to the control terminal of the MOS power transistor and effective to sense a difference in electric potential between at least one conduction terminal of the MOS power transistor and the body terminal of the MOS power transistor, wherein the control logic circuit further comprises a ringing suppression circuit portion having an input stage coupled to one of the control terminals of the first electronic switch and the MOS power transistor, and an output stage formed of PMOS transistors and coupled to the inductor.

9. A method of converting a DC input signal presented on an input terminal into a DC output signal presented on an output terminal of a converting/rectifying circuit, the method comprising:

using a first electronic switch for effectively coupling an inductor between the input terminal and a reference voltage, the inductor transferring energy from the input terminal to the output terminal;

biasing a body terminal of a MOS power transistor that is coupled between the inductor and the output terminal with either a voltage from the input terminal or the output terminal; and driving a control terminal of the MOS power transistor according to a difference in electric potential between a conduction terminal of the MOS power transistor and the body terminal of the MOS power transistor.

10. The method of claim 9 wherein biasing the body terminal of the MOS power transistor with either a voltage from the input terminal or the output terminal comprises driving the body terminal with the higher of the voltages present at the input terminal or the output terminal.

11. A synchronous CMOS rectifying circuit comprising:

an inductor coupled to an input terminal of the rectifying circuit and selectively shorted to a reference voltage responsive to a first signal;

a MOS power transistor having a first conduction terminal connected to a terminal of the inductor, a second conduction terminal coupled to an output terminal of the rectifier, and a control terminal;

a biasing circuit structured to provide to a body terminal of the MOS power transistor a voltage to keep a parasitic body-drain diode and a body-source diode of the MOS power transistor in a reversed bias state; and a control logic circuit coupled to the control terminal of the MOS power transistor and structured to drive the MOS power transistor and generate the first signal, wherein the control logic circuit further comprises a ringing suppression circuit portion having an input stage coupled to the control terminal of the MOS power transistor and an output stage coupled to the inductor, the ringing suppression circuit portion being structured to suppress ringing by the inductor and MOS power transistor.

12. The rectifying circuit of claim 11 wherein the biasing circuit comprises a first bias input from the input terminal and a second bias input from the output terminal and wherein the biasing circuit is structured to supply to the body terminal a signal from either the first bias input or the second bias input.

13. The rectifying circuit of claim 11 wherein the control logic circuit comprises:

a drive block for driving a first electronic switch responsive to the first signal and for driving the MOS power transistor; and a compare block arranged to sense a difference in electric potential between one of the terminals of the power MOS transistor and the body terminal of the MOS transistor, and to supply an enable signal to the drive block.

14. The rectifying circuit of claim 13 wherein the control logic circuit further comprises a digital generator for generating short pulses to turn on the MOS power transistor synchronously during a power-off transient of the first electronic switch.

* * * * *

UNITED STATES PATENT AND TRADEMARK OFFICE
CERTIFICATE OF CORRECTION

PATENT NO. : 6,310,466 B1 Page 1 of 1
APPLICATION NO. : 09/610300
DATED : October 30, 2001
INVENTOR(S) : Marcello Criscione It is certified that error appears in the above-identified patent and that said Letters Patent is hereby corrected as shown below:

Column 7
Line 5, claim 1 "rectifier" should read as -- rectifying circuit --

Column 7
Line 59, claim 7 "rectifier" should read as -- rectifying circuit --

Column 8
Line 25, claim 8 "rectifier" should read as -- rectifying circuit --

Column 9
Line 4, claim 11 "rectifier" should read as -- rectifying circuit --

Signed and Sealed this

Twentieth Day of January, 2009

JON W. DUDAS
*Director of the United States Patent and Trademark Office*